United States Patent [19]

Ueda et al.

[11] 4,132,474
[45] Jan. 2, 1979

[54] ELECTROMAGNETIC RELEASE DEVICE FOR USE IN CAMERAS

[75] Inventors: Hiroshi Ueda, Nara; Takayoshi Miyamoto; Masatake Niwa, both of Sakai, all of Japan

[73] Assignee: Minolta Camera Kabushiki Kaisha, Osaka, Japan

[21] Appl. No.: 821,109

[22] Filed: Aug. 2, 1977

[30] Foreign Application Priority Data

Aug. 4, 1976 [JP] Japan .................................. 51-92348

[51] Int. Cl.² .............................................. G03B 9/08
[52] U.S. Cl. .................................... 354/234; 354/266
[58] Field of Search ............... 354/152, 226, 234, 235, 354/266, 267, 205

[56] References Cited

U.S. PATENT DOCUMENTS

| 3,646,869 | 3/1972 | Arai | 354/234 |
| 4,062,028 | 12/1977 | Tezuka et al. | 354/152 |

FOREIGN PATENT DOCUMENTS

| 104623 | 10/1974 | Japan | 354/234 |
| 109723 | 8/1975 | Japan | 354/234 |

Primary Examiner—John Gonzales
Attorney, Agent, or Firm—Wolder, Gross & Yavner

[57] ABSTRACT

A single lens reflex camera includes an electromagnetic release device in which a locking mechanism including an armature is moved to an inoperative position under a spring force to release the locking of a drive member when a solenoid generates a magnetic force to cancel the magnetic attractive force of a permanent magnet, which attractive force attracts the armature to a core, thereby maintaining the locking mechanism in an operative position. The drive member thus released actuates an exposure initiating mechanism of the camera to start exposure operations. In response to the completion of the closing of the shutter, a signal member moves to release a spring loaded resetting member from locking by another locking mechanism. The resetting member thus released resets the first locking mechanism to the operative position against the spring force as well as resets the drive member to a position in which the drive member is capable of being locked again by the first locking mechanism which has been reset to its operative position.

8 Claims, 3 Drawing Figures

ELECTROMAGNETIC RELEASE DEVICE FOR USE IN CAMERAS

BACKGROUND OF THE INVENTION

The present invention relates generally to improvements in camera electromagnetic release mechanisms and it relates more particularly to an improved shutter release mechanism which includes an electromagnetic device comprising a permanent magnet and solenoid.

An electromagnetic release mechanism for a camera, which is exclusively a solenoid device which is excited by a release signal so that the resulting energy may be used to attract and displace a release lock member to disengage a drive member and, thereby, to release a shutter and other elements is well known.

However, because this mechanism is such that the lock member engaging the drive member in a position away from the solenoid is attracted from that remote position by the excitation of the solenoid, a large exciting energy must be applied to the solenoid to disengage the lock member from the drive member. Accordingly, a large amount of coil current is required and this results in an increased power consumption. To obviate this disadvantage, it has been proposed to employ both a permanent magnet and a solenoid in the camera shutter electromagnetic release mechanism. Thus, a lock member biased away by an urging member is first retained in an attracted position, which is its locked position, by the magnetism of a permanent magnet so that the drive member is locked by the lock member and the solenoid is then excited to a polarity opposite to that of the permanent magnet by a release signal to counteract or cancel the magnetic force of the permanent magnet, whereby the lock member is repelled from its attracted position, which is its locked position by the accumulated energy of the urging member so as to unlock the drive member. However, even in this type of setup, because of the existence of a biasing member urging the lock member away from its locked position, it is necessary, in order that, after an exposure, the release action may be again repeated, that the lock member be reset to its attracted position where it will lock the drive member against the urging force.

Heretofore, this resetting has been accomplished in association with the film wind-up procedure or the driving of the shutter release mechanism. However, where the resetting of the lock member is effected in association with film wind-up, not only the shutter but also the automatic diaphragm mechanism and the mirror drive member are simultaneously charged by the same winding-up procedure, so that unless the resetting of the lock member has been completed prior to the completion of charging of such other elements, those other elements already charged will be immediately released. Provision must, therefore, be made for an assurance against the above problem and this entails a greater design and engineering precision which leads to an added complexity of assembly, work and a higher cost of manufacture.

Where the resetting of the lock member is effected in association with the driving of the shutter release mechanism, the lock member engages the magnetic core either at the moment of or after the shutter opens, thereby imparting vibrations to the camera body. These vibrations could result in a blurred picture.

SUMMARY OF THE INVENTION

It is accordingly, a principal object of the present invention to provide an improved electromagnetic release device for use in cameras, in which device the resetting of a locking mechanism is effected without the above described disadvantages of the conventional electromagnetic release devices of the subject type.

In accomplishing the above object, the electromagnetic release device of the present invention includes a resetting means responsive to the completion of the closing of the camera shutter. That is, in response to the termination of an exposure, the resetting means resets a locking mechanism to an operative position in which the locking mechanism is capable of locking the release initiating drive means when the drive means is reset to its cocked position.

With the above construction, the resetting of the locking mechanism has already been accomplished when an exposure initiating mechanism of a camera is again charged for the subsequent exposure because the film winding-up operation for charging the exposure initiating mechanism is conducted after the termination of an exposure. Thus, the release device of the present invention requires no structure for preventing erroneous exposure operations which occur upon the charging of the exposure initiating mechanisms in the conventional devices of the first described type. Furthermore, with the above construction, the exposure is terminated before the resetting of the locking mechanism. Thus, blurring of the picture will not occur even if the locking mechanism is reset to the operative position, causing vibration of the camera body due to engagement of the armature with the electromagnetic core.

In preferred embodiments of the present invention, the drive means is adapted to be reset to the cocked position by the same resetting means concurrently with the resetting of the locking mechanism. Furthermore, the release device is provided in a single lens reflex camera which includes a reflecting mirror movable between an image viewing position and a picture taking position and a diaphragm normally held fully open. Hence, the exposure initiating mechanism of the camera includes a mirror actuating mechanism for driving the mirror to the picture taking position and a diaphragm actuating mechanism for stopping down the diaphragm as well as including a shutter actuating mechanism. The drive means, when released from the locking mechanism, actuates these mechanisms in such manner that the shutter is opened after the diaphragm has been stopped down and the mirror has been driven to the picture taking position.

The above and other objects and features of the present invention will become more apparent from the following description taken in connection with the accompanying drawings which illustrate preferred embodiments thereof.

DESCRIPTION OF THE PREFERRED EMBODIMENTS

Figure 1:
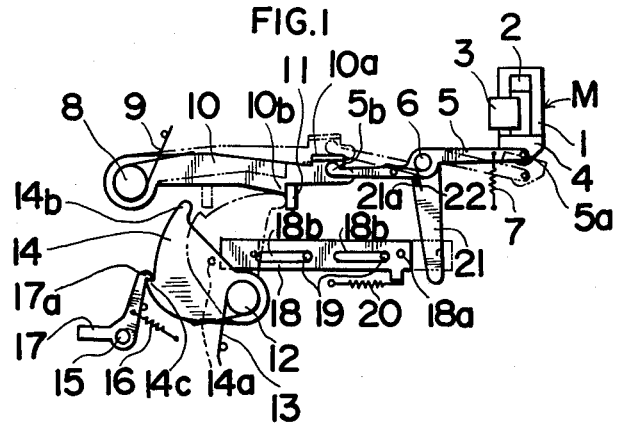
FIG. 1 is a schematic bottom plan view of an electromagnetic release device according to a first embodiment of the present invention, the device being positioned on the bottom wall of the mirror box (not shown) of a single lens reflex camera.

Referring now to the drawings, particularly FIG. 1 which illustrates a preferred embodiment thereof, the reference numeral 5 generally designates a release member which carries at one end 5a thereof, an armature piece 4 which is retained in its attracted position by the magnetic force of a permanent magnet 2 which is rigidly secured to and between the legs of a U or bracket-shaped core or yoke 1 of an electromagnetic device M, the release member 5 being pivotally mounted by a shaft 6 on the back bottom of the mirror box (not shown) of a single lens reflex camera and biased or preenergized by a spring 7 in a clockwise direction, i.e., away from the core 1 of electromagnetic device M. A lock member 10 is rotatably mounted on the back bottom of the mirror box by an independent shaft 8 and is biased or preenergized by a spring 9 similarly in a clockwise direction has a lug or bent portion 10a at its free end, which bent portion 10a is in abutment with the other end 5b of the release member 5. The lock member 10 further has a projection 10b which is adapted to lock a member 11 for driving the diaphragm and mirror in its charged or loaded position. Also swingably mounted on the back bottom of the mirror box by a separate shaft 12 is a resetting member 14 which is biased or preenergized by a spring 13 in a clockwise direction and is adapted to reset the diaphragm and mirror. The resetting member 14 is rotated in a counterclockwise direction by a known wind-up lever for charging the shutter and other camera mechanisms (not shown), against the bias or urging force of the spring 13. Further, a signal member 17 which is responsive to the completion of the closing of the shutter and is biased or preenergized in a clockwise direction by a spring 16 is pivotally mounted on the back bottom of the mirror box by still another shaft 15. The signal member 17 has a pawl 17a which is engageable with a hook or shoulder portion 14c on the release member 14 in its charged position. A connecting slide member or lever 18 which is slidable with respect to said back bottom through longitudinal guide slots 18b which are engaged by pins 19 rising from the back bottom and which is biased by a spring 20 to the left as depicted, is engageable, along its left edge, by a pin 14a projecting from the resetting member 14 in abutting relation, and when the connecting lever 18 is pushed to the right by the abutting engagement against the influence of spring 20, a pin 18a projecting from slide member 18 pushes an auxiliary lever 21. At the same time, a head portion 14b of the resetting member 14 comes into engagement with the drive member 11 which has been displaced to the position indicated by a dotted line and, thereby, pushes the latter to the right hand position indicated by a solid line. The auxiliary lever 21, rotatably mounted on the shaft 6, engages the release member 5 by means of a pin 21a projecting from the lever 21 and is biasly connected to the member 5 through a spring 22 interposed therebetween so that the lever 21 which, as aforesaid, is under the influence of spring 7, is always urged in clockwise rotation as a unit with the release member 5.

In the arrangement described above, on completion of a charging or wind-up procedure, each member is in the respective position indicated by the solid line, with the coil 3 remaining deenergized and the armature 4 being retained in abuttment with the yoke 1 of the electromagnetic device M by the magnetic force of the permanent magnet 2. If, in the above arrangement, a shutter button, which is known and not shown, is depressed, a release circuit (not shown) is energized, with a current flowing pulsewise to the coil 3 of the electromagnet device M, whereupon the solenoid generates a magnetic force which cancels or counteracts the magnetism of the permanent magnet 2. As a result, the attractive force of the electromagnetic device M undergoes a sudden drop until it is overcome and surpassed by the repellent or withdrawal force of the urging spring 7. Thereupon, the release member 5 is driven by spring 7 clockwise into the position indicated by a double dot-dash line, with its other end 5b pushing the bent portion 10a of lock member 10 in a upward direction, as illustrated and, thereby, driving the lock member 10 in a counterclockwise direction against the influence of the spring 9 into the position indicated by a double dot-dash line. As a result, the restraint of the projection 10b of the lock member 10 upon the mirror drive member 11 etc. holding the latter in the position indicated by the solid line is released.

Therefore, by the energy accumulated therein, the mirror drive member 11 is displaced to the left from the solid-line position into the position indicated by a double dot-dash line, whereby the diaphragm and mirror are displaced from the viewing position to the photographing position. When the mirror has moved out of the photographing optical path into the photographing position, the leading curtain of the shutter (not shown) is caused to start traversing to initiate an exposure by a known mechanism (not shown). In response to a signal representing a completion of the travel of the trailing curtain of the shutter (not shown) which is a completion of the exposure, the shutter closure completion signal member 17 is swung counterclockwise against the influence of the spring 16 to cause its pawl 17a to disengage the hook portion 14c of resetting member 14. Therefore, by spring 13, the resetting member 14 is driven clockwise, and, during the stroke of this rotation, the head portion 14b pushes the drive member 11 to the right from the position indicated by a broken line into the position indicated by a solid line and, at the same time, the pin 14a engages the left edge of the connecting lever 18 and causes the lever 18 to slide against the influence of spring 20 to the right from the position indicated by a solid line into the position indicated by a broken line. Consequently, the pin 18a engages the auxiliary lever 21 to drive the latter in a counterclockwise direction. Thereupon, the release member 5 is resiliently coupled to the auxiliary lever 21 by spring 22 and is also rotated in a counterclockwise direction against the influence of spring 7 to bring the armature 4 towards the yoke 1 of the electromagnetic device M. The permanent magnet 2 thereon attracts this armature by its magnetism, thus resetting the release member 5 to the attracted position. The spring-biased or resilient connection of auxiliary lever 21 to release member 5 by spring 22 as described functions to obviate any overcharge or excess energy of the auxiliary lever 21. Upon resetting of the release member 5 to the position indicated by the solid line, the lock member 10 also follows the end 5b under the influence of spring 9 and returns in a clockwise movement to the position indicated by the solid line.

The film-winding and charging operation by the wind-up lever drives the release member 14 in a counterclockwise direction against the influence of the spring 13 to a position where the hook portion 14a is engaged and locked by the pawl 17a of the shutter closure completion signal member 17. In an initial phase of the above rotation, the drive member 11 follows the rotation and moves a short distance but its leftward displacement is shortly intercepted by the projection 10b of the lock member 10 which has theretofore moved to its lock position, thus being retained in the position indicated by the solid line. At the same time, the connecting lever 18 under the influence of biasing spring 20 moves to the left following the pin 14a until it is reset to the position indicated by the solid line and the auxiliary lever 21 is urged by spring 22 in a clockwise rotation until it is stopped in the position indicated by the solid line as its pin 21a is engaged by the release member 5. In this manner, all the members are reset into the respective positions as indicated by solid lines, thus being readied for the next release action sequence. It should be understood that, in the above embodiment, the lock member 10 may be omitted and, instead, it may be so arranged that the drive member 11 is directly engageable with the release member 5.

Figure 2:
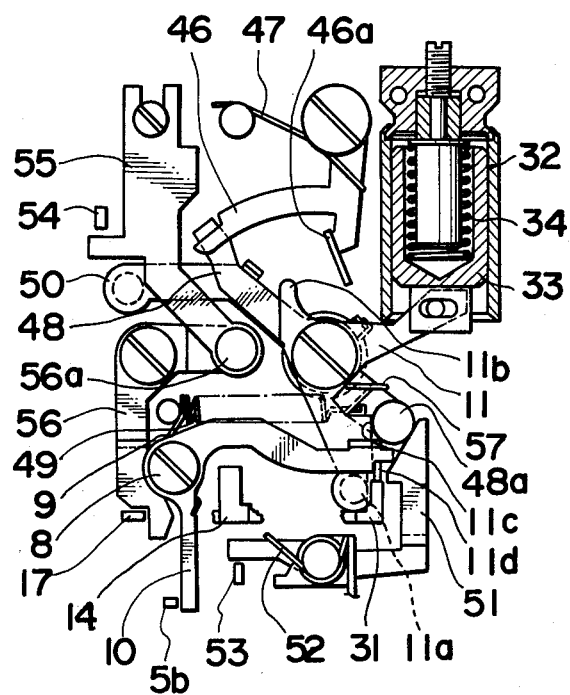
FIG. 2 is a schematic side elevational view of a portion of an electromagnetic release device according to a second embodiment of the present invention, the portion being positioned on a side wall of the mirror box (not shown) of a single lens reflex camera.
Figure 3:
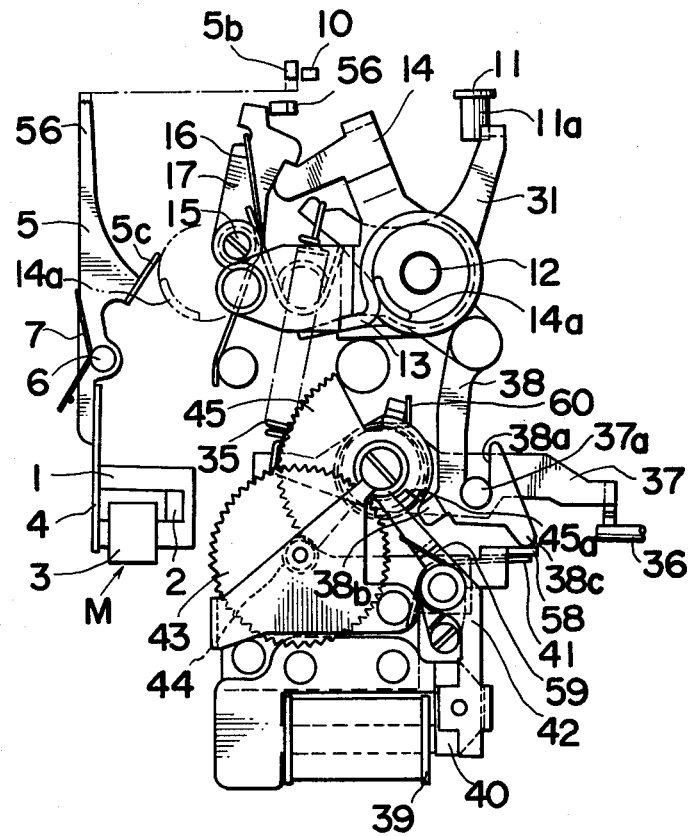
FIG. 3 is a bottom plan view of another portion of the device shown in FIG. 2, the portion being provided on a bottom wall of the mirror box and some of the elements being shown in positions displaced from the position in which they are located when assembled for avoiding superimposition of the shown elements.

The embodiment illustrated in FIGS. 2 and 3 is a modification of the embodiment of FIG. 1 wherein the latter is applied to a single reflex camera of an automatic diaphragm control type such that when the lens diaphragm (not shown) is stopped down to an opening which gives the optimum exposure at a preselected shutter speed and a predetermined film rating, the stopping-down motion is halted by a suitable balance signal.

As the coil 3 of the electromagnetic device M is pulse excited by a release signal, the magnetic force of the permanent magnet 2 is counteracted or cancelled so that the armature 4 is urged to disengage the yoke 1 by a retraction spring 7. As this occurs, the release member 5 is rotated clockwise about a pivotal shaft 6 (FIG. 3), with its arm end 5b causing a lock member 10 to turn counterclockwise against the biasing force of a spring 9, thus releasing a drive member 11 from its locked position. The drive member 11 is connected to a cylinder 33 of a control damper 32 by a pin slot connection and is gradually rotated in a clockwise direction as the cylinder 33 is driven forward under the influence of a spring 34 housed in the cylinder. Since a diaphragm drive member 31 is connected to a pin 11a on the drive member 11 by a spring 35 in a single-side abutting relation, it is driven in a counterclockwise direction (FIG. 3) as it follows the controlled clockwise rotation of the drive member 11. By connecting lever 38, the diaphragm drive member 31 is connected to a diaphragm presetting member 37, which, in turn, is connected to a diaphragm associated pin 36 in such a manner that the diaphragm normally is held in a fully opened position, with a single-side abutting relation being established between a groove 38a located in the connecting lever 38 and a pin 37a on the presetting member 37. Thus, with the counterclockwise rotation of the diaphragm drive member 31, the presetting member 37 is also driven by means of the connecting lever 38, gradually in a counterclockwise direction and, following this rotation, the diaphragm associated pin 36 is also displaced in an upward direction to gradually close the diaphragm from its fully opened position. By a balance signal from a well known light measuring circuit (not shown) a diaphragm solenoid 39 is deenergized and a diaphragm armature 40, together with a lock lever 42, is rotated by a spring 41 in a clockwise direction so that a diaphragm lock pawl of lock lever 42 is brought into engagement with a ratchet gear 43 to arrest the clockwise rotation of the gear 43. By this locking engagement, a pinion 44 supported coaxially with the ratchet gear 43 is also locked, with the result that the counterclockwise rotation of a sector gear 45 in mesh with the pinion 44 is also arrested. Accordingly, the connecting lever 38 having a lobe 38b in single-side abutment with a cam portion 45a of the sector gear 45 is also stopped, so that the diaphragm presetting member 37 is likewise stopped. By this stopping of the diaphragm presetting member 37, the diaphragm-associated pin 36 following the member 37 is also stopped to arrest the closing motion of the diaphragm and, thereby, set the lens opening or stop. The engagement of the diaphragm lock pawl 42 with the ratchet gear 43 not only sets the lens opening, as aforesaid, but also stops the counterclockwise rotation of the diaphragm drive member 31. However, the drive member 11 further continues its controlled clockwise rotation until its branch arm 11b comes into abutment with a bent portion 46a of a mirror lock member 46 and pushes the same to drive the mirror lock member 46 in a counterclockwise direction (FIG. 2) against the influence of a biasing spring 47, thus disengaging a mirror drive member 48. Consequently, the mirror drive member 48 turns clockwise under the biasing force of a spring 49 to drive the mirror through a connecting lever 50 out of the photographing optical path. Following this, a shutter leading curtain release member 51 associated with a pin 48a of the mirror drive member 48 in a single-side abutting relation is urged by a spring 52 to follow the clockwise rotation of the mirror drive member 48 to turn counterclockwise (FIG. 2), pushing a shutter leading curtain lock member 53 to disengage the leading curtain (not shown) and let it trip to start an exposure. After a predetermined time of exposure, the trip of the trailing curtain of the shutter (not shown) is initiated and when an exposure has been completed, a shutter trailing curtain trip completion signal causes a signal member 54 to be displaced in a downward direction (FIG. 2) and a member 55 to slide in a downward direction. Because the member 55 is pivotally connected to a connecting member 56 by a pin 56a, the sliding movement of the member 55 drives the connecting member 56 in a clockwise direction (FIG. 2). Therefore, the lock member 17 restraining the resetting member 14 (FIGS. 2 and 3) is rotated in a counterclockwise direction (FIG. 3) against the biasing force of its spring 16, thus freeing the resetting member 14 from its locked position for counterclockwise rotation so that the resetting member 14 is allowed to turn clockwise (FIG. 3) under the influence of its biasing spring 13 and thereby to push the pin 11a of drive member 11 and, accordingly, to rotate said drive member 11 in a counterclockwise direction (FIG. 2).

Upon the counterclockwise rotation of the drive member 11, its cam portion 11a pushes the pin 48a to thereby drive the mirror drive member 48 counterclockwise (FIG. 2) against the influence of the spring 49 and further thereby to reset the mirror into the photographing optical path (image-viewing position). Further, the pin 11a of the drive member 11 rotates the diaphragm drive member 31 in a clockwise direction (FIG. 3). The connecting lever 38 is also displaced downwards (FIG. 3) and, following this, the diaphragm presetting member 37 is also rotated clockwise (FIG. 3) to displace the diaphragm-associated pin 36 on the interchangeable lens side in a downward direction (FIG. 3) and thereby to reset the closed-down diaphragm to its fully opened position. Further, because the head portion 38c of the connecting lever 38 pushes and rotates the member 58 clockwise (FIG. 3) against the biasing force of its spring 41, the diaphragm lock member 42 biasedly associated with spring 52 is rotated clockwise (FIG. 3) to disengage its pawl from the ratchet gear 43. Consequently, the ratchet gear 43, pinion 44 and sector gear 45 are reset to their original positions under the influence of spring 60. Furthermore, upon the clockwise rotation of the resetting member 14, the projection 14a of the resetting member 14 pushes the branch arm 5a of the release member 5 to rotate the member 5 in a counterclockwise direction (FIG. 3) against the biasing force of its spring 7 to bring its armature 4 into abutment with the yoke 1 of the electromagnetic device M and the armature 4 is retained in abutting position by the magnetic force of the permanent magnet 2 of the electromagnetic device M. The lock member 10 following the arm end 5b of the release member 5 under the influence of spring 9 is driven clockwise (FIG. 2) until it is reset to the position engageable with the bent portion 11d of the drive member 11.

By the winding of the wind-up member, the resetting member 14 is charged as it is rotated clockwise (FIG. 3) against the biasing force of spring 13 and is locked by the lock member 17. It is so designed that, in the above action, the drive member 11 is rotated a little in a clockwise direction and locked by the lock member 10.

While there have been described and illustrated preferred embodiments of the present invention, it is apparent that numerous alterations, omissions and additions may be made without departing from the spirit thereof.

We claim:

1. An electromagnetic release device for use in a camera which includes a shutter and an exposure initiating mechanism, said device comprising:
    drive means movable from a cocked position to a rest position for actuating said exposure initiating mechanism to allow said shutter to be opened;
    a magnetic core;
    locking means including an armature and movable between an operative position in which said locking means locks said drive means in its cocked position with said armature in abutment with said magnetic core and an inoperative position in which said locking means releases said drive means and with said armature retracted from said magnetic core;
    a permanent magnet providing said magnetic core with a permanent magnetic attractive force to attract said armature to said magnetic core, thereby holding said locking means in its operative position;
    a solenoid energizable for generating a magnetic force to substantially counteract said permanent magnetic attractive force;
    means for biasing said locking means toward its inoperative position, the biasing force of said biasing means being smaller than said attractive force; and
    resetting means responsive to closing of said shutter for resetting said locking means to its operative position against the biasing force of said biasing means.

2. An electromagnetic release device as defined in claim 1, further comprising intermediate means arranged between said resetting means and said locking means such that said resetting means resets said locking means through said intermediate means.

3. An electromagnetic release device as defined in claim 1, wherein said resetting means resets said drive means to its cocked position together with the resetting of said locking means.

4. An electromagnetic release device as defined in claim 3, wherein said camera is of the single lens reflex type which includes a reflecting mirror movable between an image viewing position and a picture taking position and an objective lens having a diaphragm normally held open, wherein said exposure initiating mechanism includes diaphragm actuating means for stopping-down said diaphragm, mirror actuating means for driving said mirror to the picture taking position and shutter actuating means for allowing said shutter to be opened, and wherein said drive means is coupled with said diaphragm actuating means, mirror actuating means and shutter actuating means to actuate these means upon the movement thereof from the cocked to reset position in such a timing that said shutter is allowed to be opened after said diaphragm has been stopped-down and said mirror has been driven to the picture taking position.

5. An electromagnetic release device as defined in claim 4, wherein said diaphragm actuating means and mirror actuating means are reset by said resetting means through said drive means upon the resetting of said drive means.

6. In a camera including a shutter and means for actuating said shutter and movable between a cocked and released position, an electromagnet including a magnetic core provided with a permanent magnetic flux and a solenoid coupled to said core and upon energization counteracting said permanent magnetic flux, means for releasably locking said shutter actuating means in a cocked position and movable between a lock position locking said actuating means and a release position releasing said actuating means and an armature movable with said locking means to positions engaging and separated from said core with said locking means in its lock and release position respectively, spring means biasing said locking means toward its release position with a force insufficient to overcome the permanent magnetic flux retaining said armature in engagement with said magnetic core, resetting means for transferring said armature from its core separated to its core engage position and spring loaded to move from a retracted position to an armature transferring advanced position and means releasably locking said resetting means in its retracted position and responsive to the closing of said shutter for releasing said resetting means to transfer said actuating means locking means from its release to its lock position and said armature from its core separated to its core engage position.

7. The camera of claim 6 wherein said resetting means is retracted and spring loaded with the cocking of said shutter.

8. The camera of claim 6 including means for cocking said actuating means with the advance of said resetting means.

* * * * *